(12) United States Patent
Kim et al.

(10) Patent No.: US 11,575,272 B2
(45) Date of Patent: Feb. 7, 2023

(54) METHOD FOR CHARGING BATTERY

(71) Applicant: Samsung SDI Co., Ltd., Yongin-si (KR)

(72) Inventors: Chiyoung Kim, Yongin-si (KR); Kidong Kim, Yongin-si (KR); Seojae Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 158 days.

(21) Appl. No.: 17/095,528

(22) Filed: Nov. 11, 2020

(65) Prior Publication Data

US 2021/0242707 A1   Aug. 5, 2021

(30) Foreign Application Priority Data

Jan. 30, 2020   (KR) ........................ 10-2020-0011345

(51) Int. Cl.
*H02J 7/00*      (2006.01)
*H01M 10/0525*   (2010.01)

(52) U.S. Cl.
CPC ..... *H02J 7/00714* (2020.01); *H01M 10/0525* (2013.01); *H02J 7/007184* (2020.01)

(58) Field of Classification Search
USPC ........................ 320/131, 132, 133, 134, 135
See application file for complete search history.

(56) References Cited

U.S. PATENT DOCUMENTS

| | | | |
|---|---|---|---|
| 5,442,274 | A | 8/1995 | Tamai |
| 5,637,981 | A | 6/1997 | Nagai et al. |
| 5,923,149 | A | 7/1999 | Umetsu |
| 6,275,006 | B1 | 8/2001 | Koike et al. |

(Continued)

FOREIGN PATENT DOCUMENTS

| | | | |
|---|---|---|---|
| JP | 2503547 Y2 | | 7/1996 |
| JP | H0954620 A | * | 2/1997 |

(Continued)

OTHER PUBLICATIONS

Taiwan Office Action, Corresponding to Application No. 110101256, dated Mar. 4, 2022, 4 pages; English Translation of same, 3 pages.

*Primary Examiner* — Brian Ngo
(74) *Attorney, Agent, or Firm* — Lewis Roca Rothgerber Christie LLP (57) ABSTRACT

A method for battery charging includes performing a first-constant-current charging the battery with a constant current having a first intensity, determining a voltage of the battery rises above a first voltage level, performing a second-constant-current charging of the battery with a constant current having a second intensity that is less than the first intensity, determining a voltage of the battery rises above a second voltage level that is higher than the first voltage level, performing a third-constant-current charging the battery with a constant current having a third intensity that is less than the second intensity, determining a voltage of the battery rises above a third voltage level that is higher than the second voltage level, performing a constant voltage charging the battery with a constant voltage having the third voltage level, determining a charging current of the battery falls to a fourth intensity that is less than the third intensity.

14 Claims, 5 Drawing Sheets

(56) References Cited

U.S. PATENT DOCUMENTS

| | | | |
|---|---|---|---|
| 9,627,719 B2 | 4/2017 | Jung et al. | |
| 9,973,020 B2 * | 5/2018 | Loth-Krausser | ............................ H02J 7/007192 |
| 10,099,568 B2 | 10/2018 | Delobel et al. | |
| 10,553,913 B2 | 2/2020 | Kanomata | |
| 2017/0288417 A1 * | 10/2017 | Trichy | ............... G01R 31/3842 |
| 2020/0203956 A1 | 6/2020 | Chiu et al. | |

FOREIGN PATENT DOCUMENTS

| | | | | |
|---|---|---|---|---|
| JP | 2000-092738 A | 3/2000 | | |
| JP | 3208270 B2 | 9/2001 | | |
| JP | 3213401 B2 | 10/2001 | | |
| JP | 3384027 B2 | 3/2003 | | |
| JP | 2004-274874 A | 9/2004 | | |
| JP | 3678045 B2 | 8/2005 | | |
| JP | 3911049 B2 | 5/2007 | | |
| JP | 4583112 B2 | 11/2010 | | |
| JP | 5090763 B2 | 12/2012 | | |
| JP | 2014068468 A * | 4/2014 | | |
| JP | 6377637 B2 | 8/2018 | | |
| JP | 2019091690 A * | 6/2019 | ........... C07C 317/08 | |
| JP | 3152512 B2 | 4/2021 | | |
| KR | 20130100625 A * | 9/2013 | | |
| KR | 10-1367161 B1 | 2/2014 | | |
| KR | 10-1502230 B1 | 3/2015 | | |
| KR | 101502230 B1 * | 3/2015 | | |
| TW | 201403994 A | 1/2014 | | |
| TW | 1672844 B | 9/2019 | | |
| WO | WO 2016/113791 A1 | 7/2016 | | |
| WO | WO-2019242504 A1 * | 12/2019 | ....... G01R 19/16542 | |

* cited by examiner

METHOD FOR CHARGING BATTERY

CROSS-REFERENCE TO RELATED APPLICATION

This application claims priority to, and the benefit of, Korean Patent Application No. 10-2020-0011345, filed on Jan. 30, 2020, in the Korean Intellectual Property Office, the disclosure of which is incorporated herein in its entirety by reference.

BACKGROUND

1. Field

One or more embodiments relate to a method for charging a battery whereby a charging time of a battery may be reduced.

2. Description of Related Art

In general, lithium-ion battery charging devices charge a battery by using a constant current (CC)/constant voltage (CV) charging method. For example, when a battery voltage is less than or equal to a reference voltage level Vref (for example, about 4.4 V), the battery is charged with a constant current of a preset intensity I1 (for example, about 1.5 C-rate), and when the battery voltage reaches the reference voltage level Vref, the battery is charged with a constant voltage of the reference voltage level Vref.

SUMMARY

One or more embodiments include a new method for charging a battery, whereby a charging time of a battery may be reduced and the life of the battery may be increased.

Additional aspects will be set forth in part in the description which follows and, in part, will be apparent from the description, or may be learned by practice of the presented embodiments of the disclosure.

According to one or more embodiments, a method for charging a battery includes performing a first-constant-current charging the battery with a constant current having a first intensity, determining a voltage of the battery rises above a first voltage level, ending the first-constant-current charging, performing a second-constant-current charging of the battery with a constant current having a second intensity that is less than the first intensity, determining a voltage of the battery rises above a second voltage level that is higher than the first voltage level, ending the second-constant-current charging, performing a third-constant-current charging the battery with a constant current having a third intensity that is less than the second intensity, determining a voltage of the battery rises above a third voltage level that is higher than the second voltage level, ending the third-constant-current charging, performing a constant voltage charging the battery with a constant voltage having the third voltage level, determining a charging current of the battery falls to a fourth intensity that is less than the third intensity, and ending the constant voltage charging.

The second voltage level may be equal to a buffer voltage level of the battery.

A magnitude of the fourth intensity may correspond to a magnitude of a difference between the third voltage level and the buffer voltage level.

The first intensity may correspond to a charge rate that is greater than or equal to about 1.25 C-rate and less than or equal to about 2.0 C-rate, the second intensity may correspond to a charge rate that is greater than or equal to about 1.0 C-rate and less than or equal to about 1.25 C-rate, and the third intensity may correspond to a charge rate that is greater than or equal to about 0.5 C-rate and less than or equal to about 1.0 C-rate.

The first intensity may correspond to about 1.5 C-rate, the second intensity may correspond to about 1.2 C-rate, and the third intensity may correspond to about 1.0 C-rate.

The first intensity may correspond to about 1.5 C-rate, the second intensity may correspond to about 1.0 C-rate, and the third intensity may correspond to about 0.5 C-rate.

The first voltage level may be a value between about 0.95 times to about 0.98 times of the buffer voltage level, and the third voltage level may be a value between about 1.005 times to about 1.02 times of the buffer voltage level.

The first voltage level may be a value obtained by subtracting a voltage level between about 0.1 V and about 0.2 V from the buffer voltage level, and the third voltage level may be a value obtained by adding a voltage level between about 0.02 V and about 0.1 V to the buffer voltage level.

The method may further include determining the fourth intensity corresponds to about 0.15 C-rate, and obtaining the third voltage level by adding about 0.03 V to the buffer voltage level, or determining the fourth intensity corresponds to about 0.2 C-rate, and obtaining the third voltage level by adding about 0.05V to the buffer voltage level.

The method may further include fourth-constant-current charging the battery with a constant current having a fourth intensity that is less than the first intensity and that greater than the second intensity, determining a voltage of the battery rises above a fourth voltage level that is higher than the first voltage level and lower than the second voltage level, and ending the fourth-constant-current charging.

The method may further include fifth-constant-current charging of the battery with a constant current having a fifth intensity that is less than the second intensity and that is greater than the third intensity, determining a voltage of the battery rises above a fifth voltage level that is higher than the second voltage level and lower than the third voltage level, and ending charging of the constant current having the fifth intensity.

The method may further include stopping charging of the battery for a first time between the first-constant-current charging and the second-constant-current charging, stopping charging of the battery for a second time between the second-constant-current charging and the third-constant-current charging, and stopping charging of the battery for a third time between the third-constant-current charging and the constant voltage charging.

The battery may include a lithium cobalt oxide (LCO) battery cell, wherein the second voltage level is about 4.4 V.

The first voltage level may be about 4.2 V, about 4.25 V, or about 4.3 V, the third voltage level may be about 4.43 V or about 4.45 V, the first intensity may correspond to about 1.5 C-rate, the second intensity may correspond to about 1.2 C-rate, the third intensity may correspond to about 1.0 C-rate, and the third voltage level may be about 4.43 V and the fourth intensity may correspond to about 0.15 C-rate, or the third voltage level may be about 4.45 V and the fourth intensity may correspond to about 0.2 C-rate.

Embodiments will be described in more detail with reference to the accompanying drawings, so that features will be apparent to those skilled in the art.

BRIEF DESCRIPTION OF THE DRAWINGS

The above and other aspects of some embodiments of the disclosure will be more apparent from the following description taken in conjunction with the accompanying drawings, in which.

DETAILED DESCRIPTION

Features of the inventive concept and methods of accomplishing the same may be understood more readily by reference to the detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects and features of the present inventive concept to those skilled in the art. Accordingly, processes, elements, and techniques that are not necessary to those having ordinary skill in the art for a complete understanding of the aspects and features of the present inventive concept may not be described.

Unless otherwise noted, like reference numerals, characters, or combinations thereof denote like elements throughout the attached drawings and the written description, and thus, descriptions thereof will not be repeated. Further, parts not related to the description of the embodiments might not be shown to make the description clear.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

When one or more embodiments may be implemented differently, a specific process order may be performed differently from the described order. For example, two consecutively described processes may be performed substantially at the same time or performed in an order opposite to the described order.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 1:
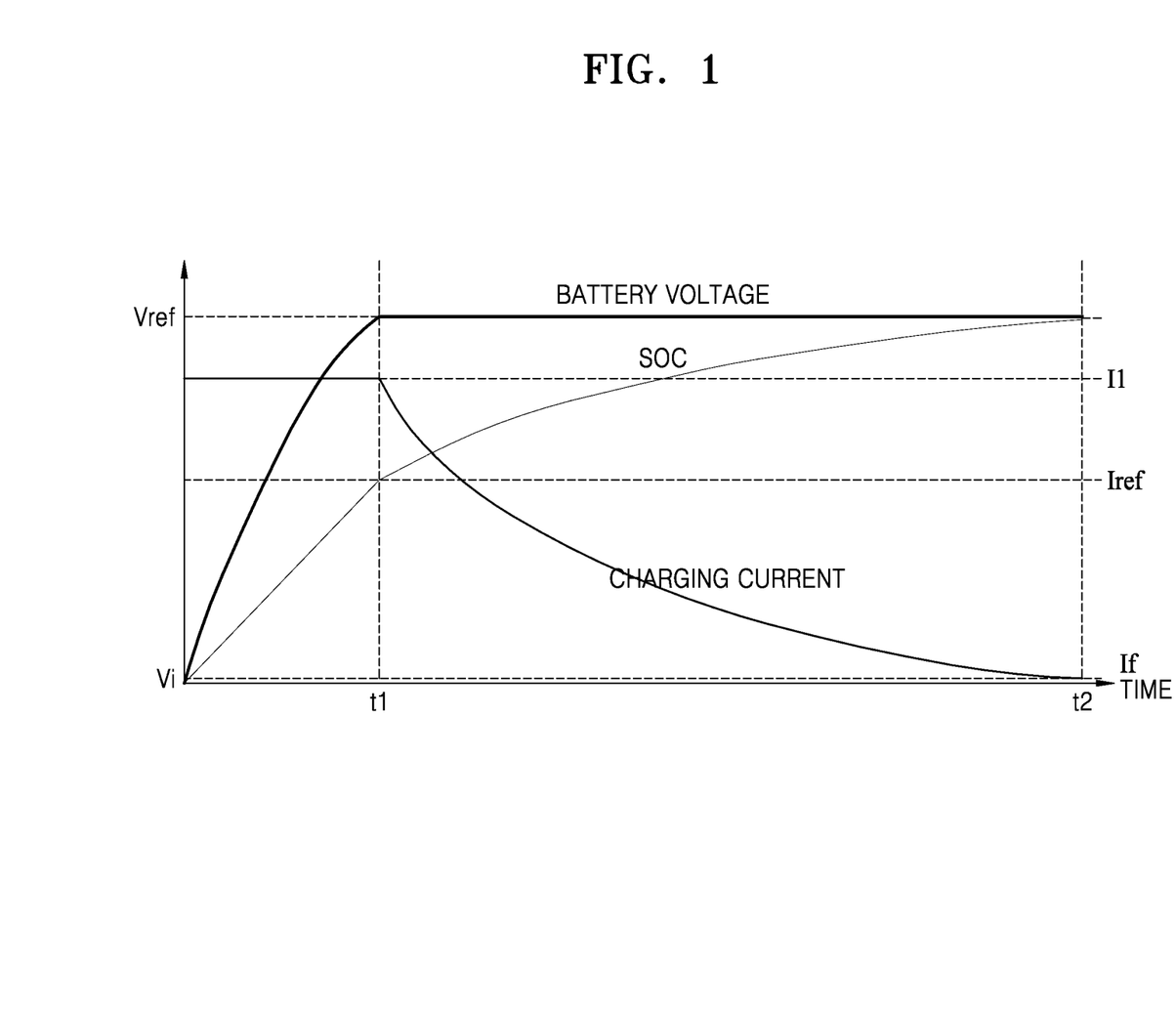
FIG. 1 is a graph showing changes in a charging current intensity and a battery voltage level when a battery is charged by using a constant current/constant voltage charging method.

FIG. 1 is a graph showing changes in a charging current intensity and a battery voltage level when a battery is charged by using a constant current/constant voltage charging method.

As shown in FIG. 1, a charging current curve is constant, or has a constant current, until t1 when the battery voltage is less than or equal to a reference voltage level Vref, and then exponentially decreases after the time t1. A battery voltage curve increases until the time t1, as a log function, and is maintained at a constant level when the battery voltage reaches the reference voltage level Vref. When a charging current flowing through the battery is gradually decreased and then reaches time t2, when the charging current reaches a preset intensity "If" (for example, an intensity of about 0.05 C-rate), it is determined that the battery is fully charged, and charging is stopped. A state of charge (SOC) of the battery is illustrated as increasing from 0 to 100%. When the SOC of the battery is 0, the battery voltage is at an initial level Vi, and when the SOC of the battery is 100%, an open circuit voltage of the battery is the reference voltage level Vref.

Such a charging method may have a disadvantage in that, due to the characteristics of the battery, the charging time of the battery may become longer in a constant voltage charging section (e.g., from time t1 to time t2), thereby resulting in a longer total charging time. Also, when a battery system operates in connection with a power system, excessive heat may be generated inside a battery cell. In addition, a softening phenomenon of a positive electrode plate (a phenomenon in which an electrolyte flows out and sticks to the electrode plate) may occur due to excessive heat, and the life of the battery may be shortened.

In the present disclosure, a battery may be charged with a charging current having a reference intensity Iref, and the reference intensity Iref may be an intensity corresponding to about 1 C-rate. For example, when the capacity of the battery is about 2000 mAh, the reference intensity Iref may be an intensity corresponding to about 1 C-rate (e.g., about 2 A).

The battery may be charged up to a voltage of a reference charging level Vref. The reference charging level Vref may be the same as a level of an open circuit voltage when the battery is fully charged. The reference charging level Vref may be referred to as a buffer voltage level. A charging device may apply a charging voltage of the reference charging level Vref to the battery in a constant voltage charging section.

Figure 2:
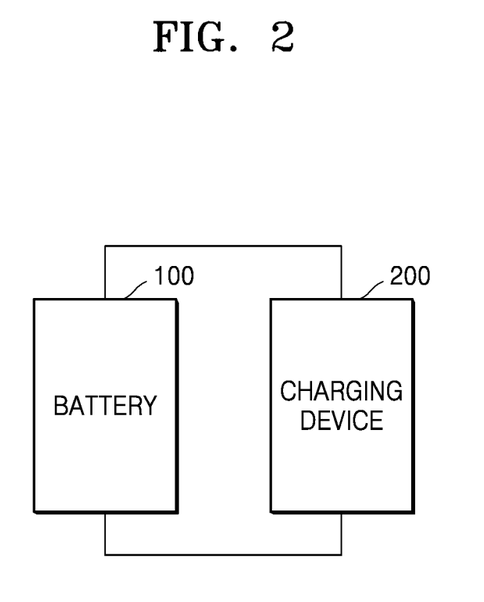
FIG. 2 illustrates a charging device for charging a battery by using a method for charging a battery according to some embodiments.
Figure 3:
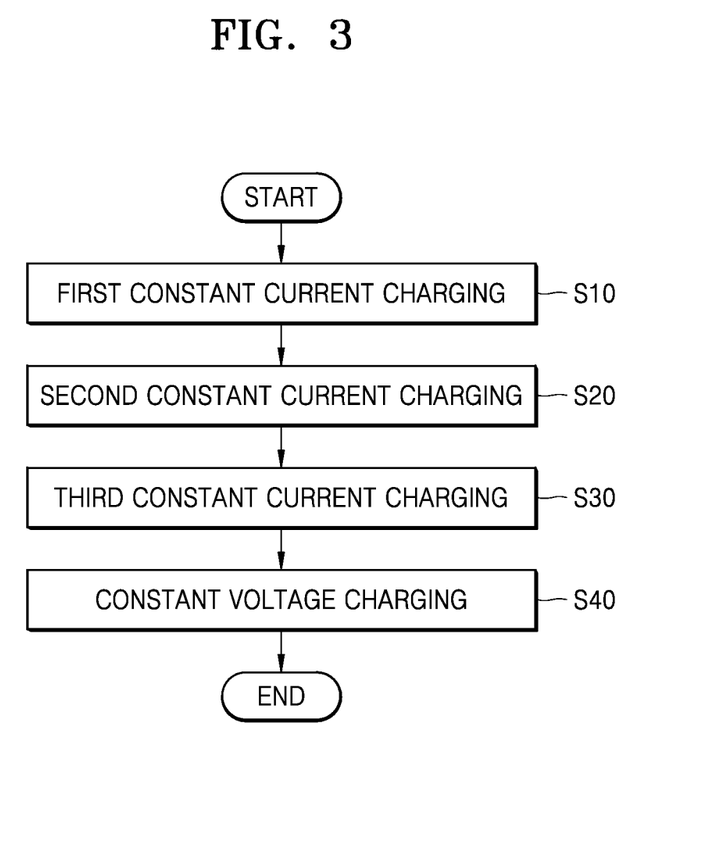
FIG. 3 is a flowchart illustrating a method for charging a battery, according to some embodiments.
Figure 4:
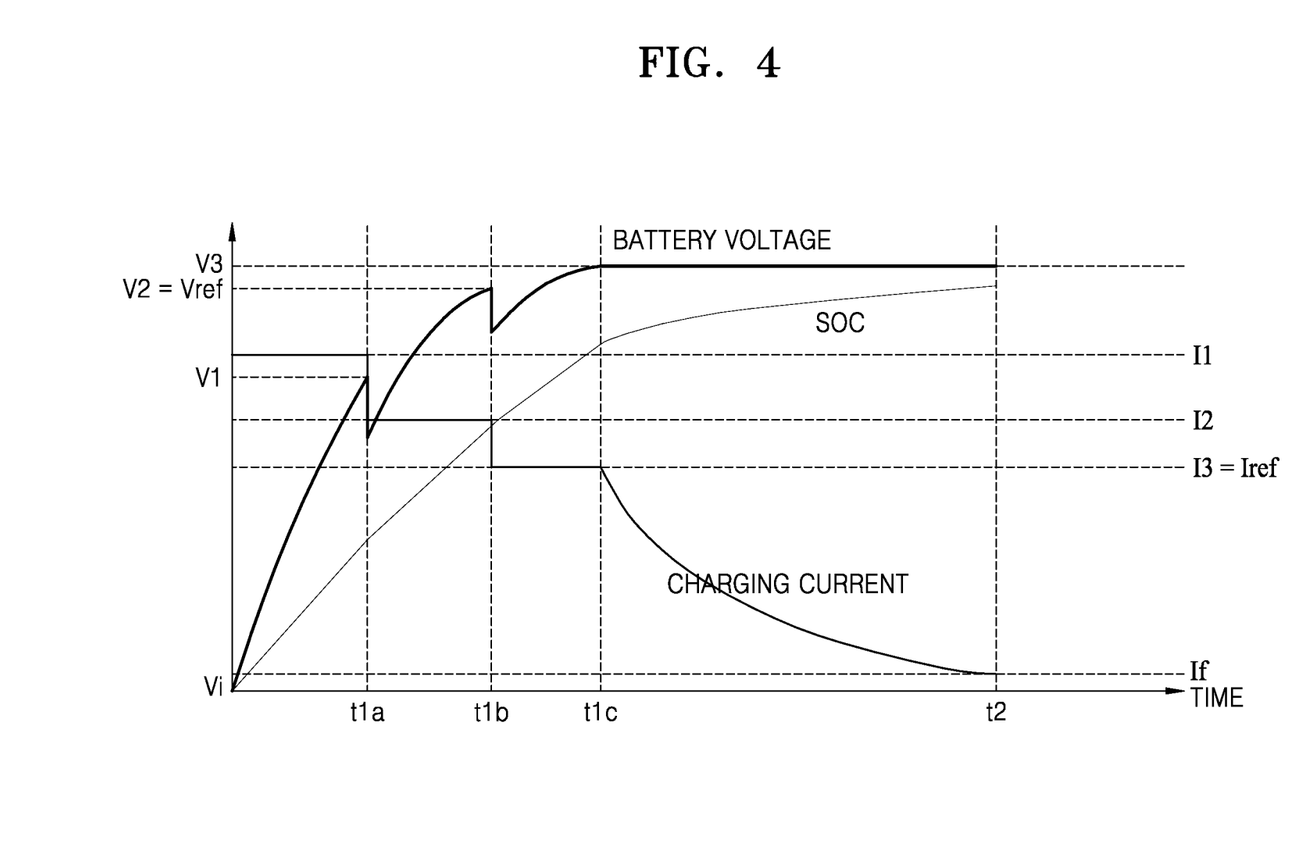
FIG. 4 is a graph showing changes in a charging current intensity and a battery voltage level when a battery is charged by using a method for charging a battery according to some embodiments.

FIG. 2 illustrates a charging device for charging a battery by using a method for charging a battery according to some embodiments, FIG. 3 is a flowchart illustrating a method for charging a battery, according to some embodiments, and FIG. 4 is a graph showing changes in a charging current intensity and a battery voltage level when a battery is charged by using a method for charging a battery according to some embodiments.

Referring to FIGS. 2 through 4, a charging device 200 may charge a battery 100 by using a method for charging a battery according to some embodiments.

The charging device 200 may charge the battery 100 by using a method for charging the battery 100, the method including first-constant-current charging of the battery 100 with a constant current having a first intensity I1, and ending the charging of the constant current having the first intensity I1 when the voltage of the battery 100 rises above the first voltage level V1 (S10).

Then, after the first-constant-current charging (S10) is performed, second-constant-current charging of the battery 100 with a constant current having a second intensity I2 that is less than the first intensity I1, and ending the charging of the constant current having the second intensity I2 when the voltage of the battery 100 rises above a second voltage level V2 that is higher than the first voltage level V1 (S20).

Then, after the second-constant-current charging (S20) is performed, third-constant-current charging of the battery 100 with a constant current having a third intensity I3 that is less than the second intensity I2, and ending the charging of the constant current having the third intensity I3 when the voltage of the battery 100 rises above a third voltage level V3 that is higher than the second voltage level V2 (S30).

Then, after the third-constant-current charging (S30) is performed, constant voltage charging of the battery 100 with a constant voltage having a third voltage level V3, and ending the charging of the constant voltage having the third voltage level V3 when a charging current of the battery 100 falls to a fourth intensity (If) that is less than the third intensity I3 (S40).

According to some embodiments, the second voltage level V2 may be about equal to the reference charging level Vref. The second voltage level V2 may be about equal to an open circuit voltage level of the battery 100 when the battery 100 is fully charged. The second voltage level V2 may be about equal to the buffer voltage level of the battery 100.

According to some embodiments, the third intensity I3 may be about equal to the reference intensity Iref. The third intensity I3 may be set to an intensity corresponding to about 1 C-rate.

In the present specification, the second voltage level V2 may be about equal to the reference charging level Vref, and the third intensity I3 may be about equal to the reference intensity Iref. However, this is just an example, and the second voltage level V2 may be as large as, or as small as, a relatively slight error when compared to the reference charging level Vref, and the third intensity I3 may be as large as, or as small as, a slight error compared to the reference intensity Iref.

Embodiments of the present disclosure may be described based on the assumption that the battery 100 is substantially fully discharged before the first-constant-current charging (S10) is performed. However, the battery 100 might not be fully discharged. Even in this case, the charging device 200 may perform S10 through S40 (e.g., sequentially). However, the first-constant-current charging (S10) might not be substantially performed according to the remaining capacity of the battery 100, or the first-constant-current charging (S10) may be performed only for a very short time.

In the first-constant-current charging (S10), the charging device 200 may charge the battery 100 with a constant current having the first intensity I1. The first intensity I1 may be greater than the reference intensity Iref. According to an example, the first intensity I1 may be set to an intensity corresponding to a charge rate that is greater than or equal to about 1.25 C-rate and less than or equal to about 2.0 C-rate. For example, the first intensity I1 may be set to an intensity corresponding to about 1.5 C-rate.

The charging device 200 may end charging of the constant current having the first intensity I1 when the voltage of the battery 100 rises above the first voltage level V1 at time t1a. The first voltage level V1 may be lower than the reference charging level Vref. According to an example, the first voltage level V1 may be set to a value between about 0.95 times and about 0.98 times of the reference charging level Vref. According to another example, the first voltage level V1 may be set to a value obtained by subtracting a voltage level between about 0.1 V and about 0.2 V from the buffer voltage level. For example, when the reference charging level Vref is about 4.4 V, the first voltage level V1 may be set to be about 4.2 V, about 4.25 V, or about 4.3 V.

In the second-constant-current charging (S20), which may occur after the first-constant-current charging (S10) is performed, the charging device 200 may charge the battery 100 with a constant current having the second intensity I2. The second intensity I2 may be less than the first intensity I1. According to an example, the second intensity I2 may be set to an intensity corresponding to a charge rate that is greater than or equal to about 1.0 C-rate and less than or equal to about 1.25 C-rate. For example, the second intensity I2 may be set to an intensity corresponding to about 1.2 C-rate, or may be set to an intensity corresponding to about 1.0 C-rate.

The charging device 200 may end charging of the constant current having the second intensity I2 when the voltage of the battery 100 rises above the second voltage level V2 at time t1b. The second voltage level V2 may be higher than the first voltage level V1, and may be about equal to the reference charging level Vref.

According to another example, between the first-constant-current charging (S10) and the second-constant-current charging (S20), charging of the battery 100 may be stopped (e.g., temporarily stopped for a stoppage time/preset time). According to an example, charging of the battery 100 may be stopped for between about 5 minutes and about 20 minutes, for example (e.g., about 10 minutes). Also, the stoppage time may vary according to the temperature of the battery 100.

In the third-constant-current charging (S30) after the second-constant-current charging (S20) is performed, the charging device 200 may charge the battery 100 with a constant current having the third intensity I3. The third intensity I3 may be less than the second intensity I2. The third intensity I3 may be about equal to the reference intensity Iref. According to an example, the third intensity I3 may be set to an intensity corresponding to a charge rate that is greater than or equal to about 0.5 C-rate and less than or equal to about 1.0 C-rate. For example, the third intensity I3 may be set to an intensity corresponding to about 1.0 C-rate, or may be set to an intensity corresponding to about 0.5 C-rate.

The charging device 200 may end charging of the constant current having the third intensity I3 when the voltage of the battery 100 rises above the third voltage level V3 at time t1c. The third voltage level V3 may be higher than the reference charging level Vref. According to an example, the third voltage level V3 may be set to a value between about 1.005 times and about 1.02 times of the reference charging level Vref. According to another example, the third voltage level V3 may be set to a value obtained by subtracting a voltage level between about 0.02 V and about 0.1 V from the buffer voltage level. For example, when the reference charging level Vref is about 4.4 V, the third voltage level V3 may be set to about 4.43 V or about 4.45 V.

According to another example, between the second-constant-current charging (S20) and the third-constant-current charging (S30), charging of the battery 100 may be stopped (e.g., temporarily stopped for a preset time). According to an example, the preset time may be between about 5 minutes and about 20 minutes, for example. For example, the preset time may be set to about 10 minutes. In some embodiments, the preset time may vary according to the temperature of the battery 100.

In the constant voltage charging (S40) after the third-constant-current charging (S30) is performed, the charging device 200 may charge the battery 100 with a constant voltage having the third voltage level V3. The charging device 200 may end charging of the constant voltage having the third voltage level V3 when the charging current of the battery 100 falls to the fourth intensity (If) at time t2. The fourth intensity (If) may be less than the third intensity I3. According to an example, the fourth intensity (If) may be less than an intensity corresponding to about 0.3 C-rate. The fourth intensity (If) may be understood as a charging end current intensity.

The fourth intensity (If) may be greater as a difference between the third voltage level V3 and the reference charging level Vref increases. For example, when the reference charging level Vref is set to about 4.4 V and the third voltage level V3 is set to about 4.43 V, the fourth intensity (If) may be set to an intensity corresponding to about 0.15 C-rate. When the reference charging level Vref is set to about 4.4 V and the third voltage level V3 is set to about 4.45 V, the fourth intensity (If) may be set to an intensity corresponding to about 0.20 C-rate.

As the difference between the third voltage level V3 and the reference charging level Vref increases, the fourth intensity (If) may be relatively large so that a charging speed of the battery 100 may be increased, and so that a likelihood of overvoltage charging of the battery 100 may be reduced or prevented.

According to other embodiments, between the third-constant-current charging (S30) and the constant voltage charging (S40), charging of the battery 100 may be stopped (e.g., for a preset time). According to an example, the preset time may be between about 5 minutes and about 20 minutes, for example. For example, the preset time may be set to about 10 minutes. The preset time may vary according to the temperature of the battery 100.

Below, the time required to charge the battery 100 having the reference charging level Vref of about 4.4 V by using a charging method will be compared with the time required to charge the battery 100 having the reference charging level of about 4.4 V by using a charging method according to various examples of the present disclosure. The battery 100 may be a lithium cobalt oxide (LCO) battery cell having a nominal voltage of about 3.85 V.

When the battery 100 is charged by using a charging method shown in FIG. 1 (e.g., after a constant current is charged with an intensity corresponding to about 1.5 C-rate), when a battery voltage reaches about 4.4 V, and constant voltage charging of about 4.4 V is performed, it may take about 88 minutes to fully charge the battery 100. A constant current charging time may be about 19 minutes, and a constant voltage charging time may be about 69 minutes.

Contrastingly, when the battery 100 is charged by using a charging method according to some embodiments, it may take about 61 minutes to about 68 minutes to fully charge the battery 100 according to various examples. The first, second, and third intensities I1, I2, and I3 may be set to an intensity corresponding to about 1.5 C-rate, about 1.2 C-rate, and about 1.0 C-rate, respectively.

According to an example, when the first and third voltage levels V1 and V3 are set to about 4.2 V and about 4.43 V, respectively, and the charging end current intensity (If) is set to an intensity corresponding to about 0.15 C-rate, a total constant current charging time may be about 33 minutes, and a constant voltage charging time may be about 35 minutes. That is, it may take about 68 minutes to fully charge the battery 100.

According to another example, when the first and third voltage levels V1 and V3 are set to about 4.2 V and to about 4.45 V, respectively, and the charging end current intensity (If) is set to an intensity corresponding to about 0.20 C-rate, a total constant current charging time may be about 35 minutes, and a constant voltage charging time may be about 28 minutes. That is, it may take about 63 minutes to fully charge the battery 100.

According to another example, when the first and second voltage levels V1 and V3 are set to about 4.25 V and to about 4.43 V, respectively, and the charging end current intensity (If) is set to an intensity corresponding to about 0.15 C-rate, a total constant current charging time may be about 32 minutes, and a constant voltage charging time may be about 36 minutes. That is, it may take about 68 minutes to fully charge the battery 100.

According to another example, the first and third voltage levels V1 and V3 are set to 4.25 V and 4.45 V, respectively, and the charging end current intensity (If) is set to an intensity corresponding to 0.20 C-rate, a total constant current charging time is 33 minutes, and a constant voltage charging time is 29 minutes. That is, 62 minutes are taken to fully charge the battery 100.

According to another example, when the first and third voltage levels V1 and V3 are set to about 4.3 V and about 4.43 V, respectively, and the charging end current intensity (If) is set to an intensity corresponding to about 0.15 C-rate, a total constant current charging time may be about 31 minutes, and a constant voltage charging time may be about 36 minutes. That is, it may take about 67 minutes to fully charge the battery 100.

According to another example, when the first and third voltage levels V1 and V3 are set to about 4.3 V and to about 4.45 V, respectively, and the charging end current intensity (If) is set to an intensity corresponding to about 0.20 C-rate, a total constant current charging time may be about 32 minutes, and a constant voltage charging time may be about 29 minutes. That is, it may take about 61 minutes to fully charge the battery 100.

Thus, according to various examples, the time required to fully charge the battery 100 may be reduced by about 20% to about 30%.

Figure 5:
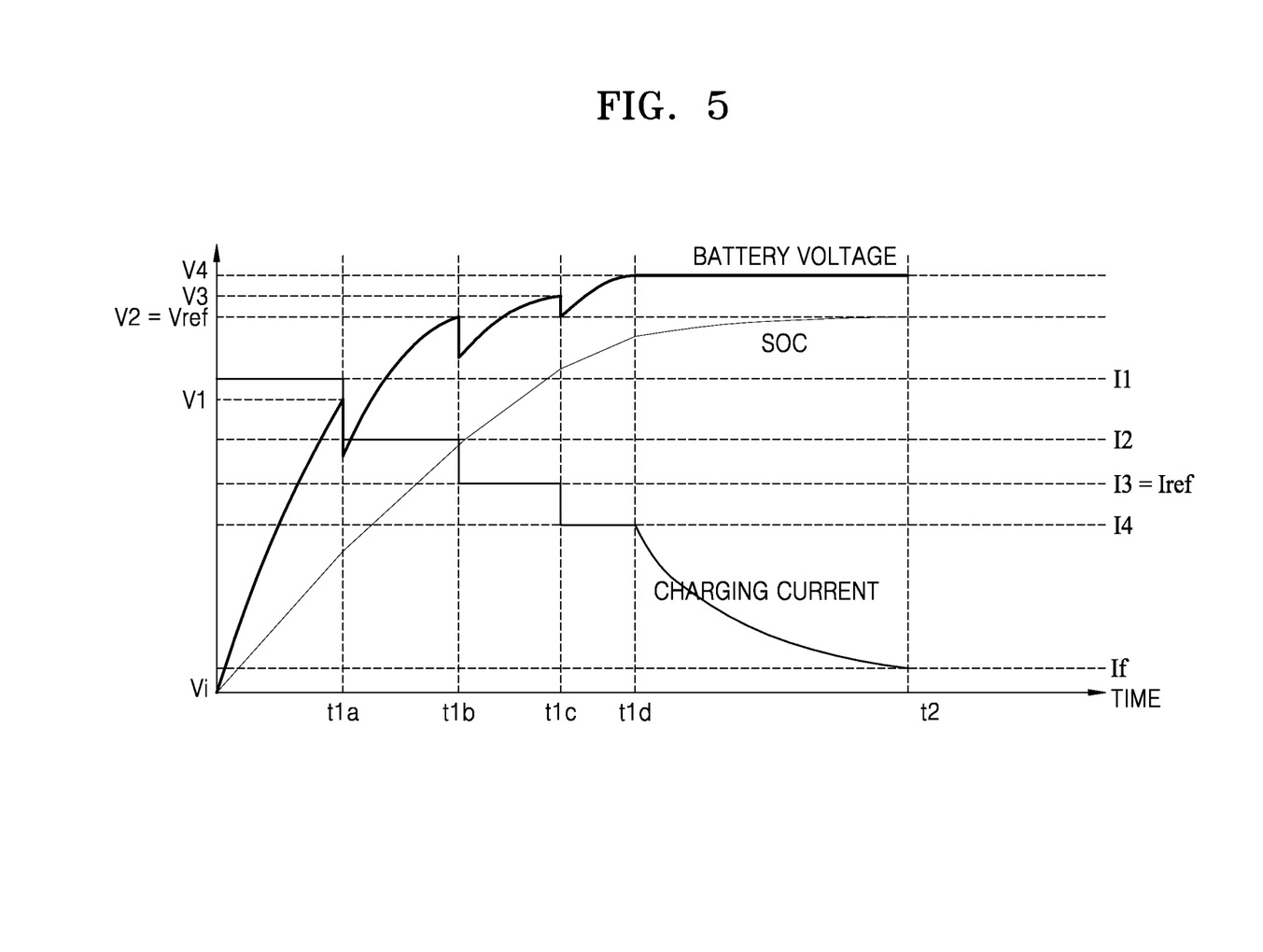
FIG. 5 is a graph showing changes in a charging current intensity and a battery voltage level when a battery is charged by using a method for charging a battery according other embodiments.

FIG. 5 is a graph showing changes in a charging current intensity and a battery voltage level when a battery is charged by using a charging method according other embodiments.

Referring to FIG. 5, the charging method of FIG. 5 is substantially the same as the charging method of FIG. 4, except further includes a fourth-constant-current charging section between the time t1c and the time t1d, as compared to the charging method of FIG. 4. The aspects common to those described above will not be repeated.

In a fourth-constant-current charging, occurring after the third-constant-current charging (S20) is performed, the charging device 200 may charge the battery 100 with a constant current having the fourth intensity I4. The fourth intensity I4 may be less than the third intensity I3. According to an example, the fourth intensity I4 may be set to an intensity corresponding to a charge rate that is greater than or equal to about 0.4 C-rate and less than or equal to about 0.8 C-rate. For example, the fourth intensity I4 may be set to an intensity corresponding to about 0.7 C-rate, or may be set to an intensity corresponding to about 0.5 C-rate.

The charging device 200 may end charging of the constant current having the fourth intensity I4 when the voltage of the battery 100 rises above a fourth voltage level V4 at time t1d. The fourth voltage level V4 may be higher than the reference charging level Vref. According to an example, the fourth voltage level V4 may be set to a value between about 1.02 times and about 1.05 times of the reference charging level Vref. According to another example, the fourth voltage level V4 may be set to a value obtained by adding a voltage level between about 0.05 V and about 0.2 V to the buffer voltage level. For example, when the reference charging level Vref is about 4.4 V, the third voltage level V3 may be set to about 4.48 V or to about 4.5 V.

According to another example, between the third-constant-current charging (S30) and the fourth-constant-current charging, charging of the battery 100 may be stopped (e.g., for a preset time).

In the constant voltage charging (S40) after the fourth-constant-current charging is performed, the charging device 200 may charge the battery 100 with a constant voltage having the fourth voltage level V4. The charging device 200 may end charging of the constant voltage having the fourth voltage level V4 when the charging current of the battery 100 falls to the fourth intensity (If) at time t2.

According to other embodiments, between the first-constant-current charging (S10) and the second-constant-current charging (S20) in the charging method of FIG. 1, the charging device 200 may charge the battery 100 with a constant current having an intensity that is less than the first intensity I1 and that is greater than the second intensity I2. The charging device 200 may end charging of the constant current when the voltage of the battery 100 rises above a voltage level that is higher than the first voltage level V1 and lower than the second voltage level V2, and then may perform the second-constant-current charging (S20).

According to other embodiments, between the second-constant-current charging (S20) and the third-constant-current charging (S30) in the charging method of FIG. 1, the charging device 200 may charge the battery 100 with a constant current having an intensity that is less than the second intensity I2 and that is greater than the third intensity I3. The charging device 200 may end charging of the constant current when the voltage of the battery 100 rises above a voltage level that is higher than the second voltage level V2 and lower than the third voltage level V3, and then may perform the third-constant-current charging (S30).

In a method for charging a battery according to various embodiments of the present disclosure, the life of a battery may be extended, and a charging time of the battery may be reduced.

Various embodiments of the present disclosure do not limit the scope of the present disclosure in any way. For the sake of brevity, conventional electronics, control systems, software development and other functional aspects of the systems (and components of the individual operating components of the systems) may not be described in detail. Furthermore, the connection lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the present disclosure unless the element is specifically described as "essential" or "critical".

In the specification of embodiments (in particular, claims), the use of the terms "a" and "an" and "the" and similar referents in the context of describing the present disclosure (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The present disclosure is not necessarily limited according to the description order of the steps. The use of any and all examples, or exemplary language (e.g., "such as") provided herein, is intended merely to better illuminate the disclosed embodiments and does not pose a limitation on the scope of the disclosure unless otherwise claimed. Numerous modifications and adaptations will be readily apparent to those skilled in this art without departing from the spirit and scope of the present disclosure.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims, with functional equivalents thereof to be included therein.

What is claimed is:

1. A method for charging a battery, the method comprising:
    performing a first-constant-current charging of the battery with a first constant current having a first intensity;
    determining the battery rises above a first voltage level;
    ending the first-constant-current charging;
    performing a second-constant-current charging of the battery with a second constant current having a second intensity that is less than the first intensity;
    determining the battery rises above a second voltage level that is higher than the first voltage level;
    ending the second-constant-current charging;
    performing a third-constant-current charging of the battery with a third constant current having a third intensity that is less than the second intensity;
    determining the battery rises above a third voltage level that is higher than the second voltage level;
    ending the third-constant-current charging;
    performing a constant voltage charging of the battery with a constant voltage having the third voltage level;
    determining a charging current of the battery falls to a fourth intensity that is less than the third intensity; and
    ending the constant voltage charging.

2. The method of claim 1, wherein the second voltage level is equal to a buffer voltage level of the battery.

3. The method of claim 2, wherein a magnitude of the fourth intensity may correspond to a difference between the third voltage level and the buffer voltage level.

4. The method of claim 2, wherein the first intensity corresponds to a first charge rate that is greater than or equal to about 1.25 C-rate, and that is less than or equal to about 2.0 C-rate,
    wherein the second intensity corresponds to a second charge rate that is greater than or equal to about 1.0 C-rate, and that is less than or equal to about 1.25 C-rate, and
    wherein the third intensity corresponds to a third charge rate that is greater than or equal to about 0.5 C-rate, and that is less than or equal to about 1.0 C-rate.

5. The method of claim 2, wherein the first intensity corresponds to about 1.5 C-rate, the second intensity corresponds to about 1.2 C-rate, and the third intensity corresponds to about 1.0 C-rate.

6. The method of claim 2, wherein the first intensity corresponds to about 1.5 C-rate, the second intensity corresponds to about 1.0 C-rate, and the third intensity corresponds to about 0.5 C-rate.

7. The method of claim 2, wherein the first voltage level is a first value between about 0.95 times to about 0.98 times the buffer voltage level, and
    wherein the third voltage level is a third value between about 1.005 times to about 1.02 times the buffer voltage level.

8. The method of claim 2, wherein the first voltage level is a first value obtained by subtracting a voltage level between about 0.1 V and about 0.2 V from the buffer voltage level, and
    wherein the third voltage level is a third value obtained by adding a voltage level between about 0.02 V and about 0.1 V to the buffer voltage level.

9. The method of claim 2, further comprising:
    determining the fourth intensity corresponds to about 0.15 C-rate; and
    obtaining the third voltage level by adding about 0.03 V to the buffer voltage level; or
    determining the fourth intensity corresponds to about 0.2 C-rate; and
    obtaining the third voltage level by adding about 0.05 V to the buffer voltage level.

10. The method of claim 1, further comprising fourth-constant-current charging the battery with a fourth constant current having a fourth intensity that is less than the first intensity, and that is greater than the second intensity;
    determining the battery rises above a fourth voltage level that is higher than the first voltage level, and that is lower than the second voltage level; and
    ending the fourth-constant-current charging.

11. The method of claim 1, further comprising fifth-constant-current charging of the battery with a fifth constant current having a fifth intensity that is less than the second intensity, and that is greater than the third intensity;
    determining the battery rises above a fifth voltage level that is higher than the second voltage level, and that is lower than the third voltage level; and
    ending charging of the fifth constant current having the fifth intensity.

12. The method of claim 1, further comprising:
    stopping charging of the battery for a first time between the first-constant-current charging and the second-constant-current charging;
    stopping charging of the battery for a second time between the second-constant-current charging and the third-constant-current charging; and
    stopping charging of the battery for a third time between the third-constant-current charging and the constant voltage charging.

13. The method of claim 1, wherein the battery comprises a lithium cobalt oxide (LCO) battery cell, and
    wherein the second voltage level is about 4.4 V.

14. The method of claim 13, wherein the first voltage level is about 4.2 V, about 4.25 V, or about 4.3 V,
    wherein the third voltage level is about 4.43 V or about 4.45 V,
    wherein the first intensity corresponds to about 1.5 C-rate,
    wherein the second intensity corresponds to about 1.2 C-rate, wherein the third intensity corresponds to about 1.0 C-rate, and wherein the third voltage level is about 4.43 V and the fourth intensity corresponds to about 0.15 C-rate, or wherein the third voltage level is about 4.45 V and the fourth intensity corresponds to about 0.2 C-rate.

\* \* \* \* \*